(Model.)
J. A. SHONE.
DEVICE FOR HOLDING SPECTACLES.
No. 264,574. Patented Sept. 19, 1882.
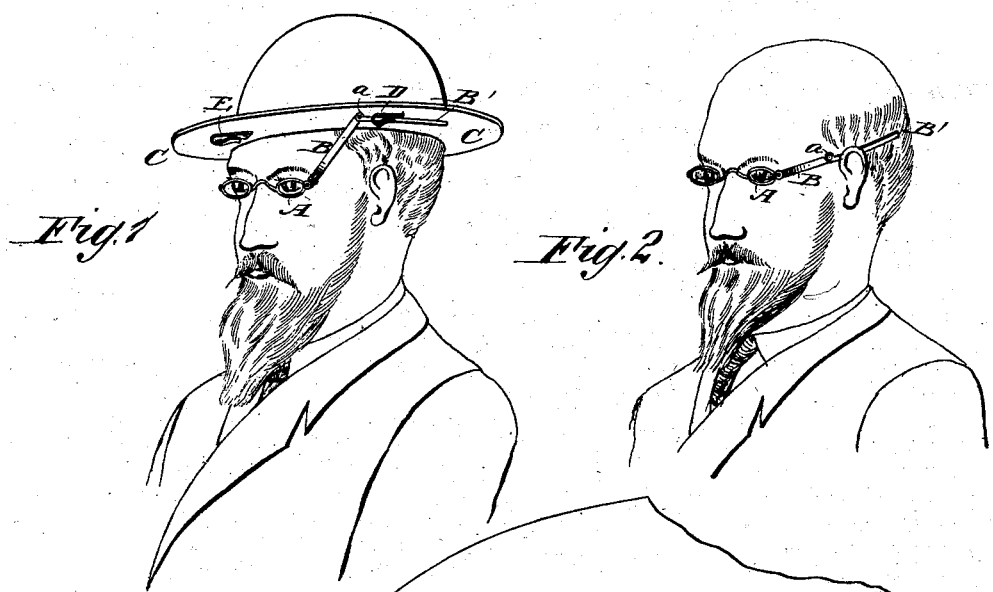
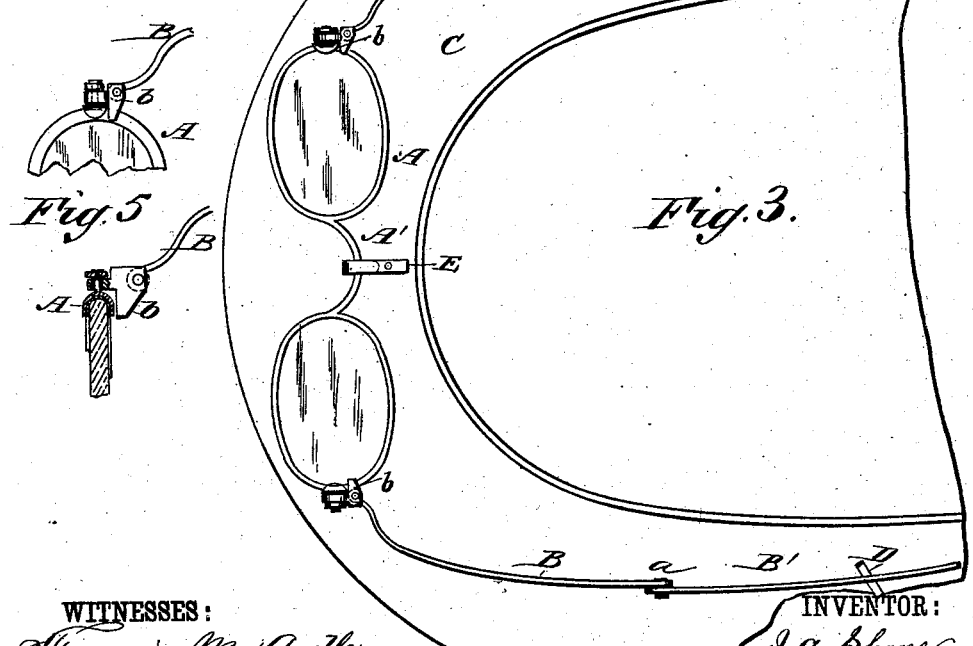
WITNESSES:
Francis McArdle
C. Sedgwick
INVENTOR:
J. A. Shone
BY Munn & Co
ATTORNEYS.

UNITED STATES PATENT OFFICE.

JOSEPH A. SHONE, OF SALEM, MISSISSIPPI.

DEVICE FOR HOLDING SPECTACLES.

SPECIFICATION forming part of Letters Patent No. 264,574, dated September 19, 1882.

Application filed April 18, 1882. (Model.)

*To all whom it may concern:*

Be it known that I, JOSEPH A. SHONE, of Salem, in the county of Benton and State of Mississippi, have invented a new and Improved Spectacle-Holder, of which the following is a full, clear, and exact description.

The object of my invention is to provide a new and improved device for holding spectacles in front of the eyes or for holding them when not in use.

The invention consists in a hat rim or shade provided on the under side with hooks for holding the bows and lens frames of spectacles, whereby the spectacles can be held to the under side of the shade when not in use, or can be lowered upon the nose when they are to be used.

The invention also consists in spectacles provided with check-lugs projecting from the inner sides of the bows adjoining to the lenses, against which lugs the lenses can rest when placed upright for use.

Reference is to be had to the accompanying drawings, forming part of this specification, in which similar letters of reference indicate corresponding parts in all the figures.

Figure 1 is a perspective view of my improved spectacle-holder, showing the manner in which it is used. Fig. 2 shows the spectacles removed from the holder. Fig. 3 is a plan view of the under side of the spectacle-holder, showing the manner of holding the spectacles when not in use. Fig. 4 is a detail longitudinal elevation of one end of one of the lens-frames, showing the manner in which it is pivoted to the bows. Fig. 5 is a sectional elevation of the same.

The lens-frames A, which are connected by a nose-piece, A', in the usual manner, are pivoted to the ends of the bows B B', which are provided with a hinge-joint, *a*, in the usual manner.

The bows are provided at the hinged ends with lugs *b*, projecting from the inner sides, against which lugs the edges of the lens-frames rest when the lenses are to be held at right angles to the bows—that is, when the spectacles are in use.

The rim or shade C of a hat is provided on the under side with two hooks, D, which are fastened to it, one at each side of the head-opening of the hat, and with a hook, E, fastened on the under side of the shade, on the front part of the same. The hooks D and E can be fastened in any suitable manner, and can be fixed stationary, or can be pivoted or arranged to turn. The shade C only, without the hat part, can be used, as it is not healthy to wear a hat indoors, and spectacles are mostly used indoors—that is, while reading, working, &c. The shade also serves to protect the eyes from the direct rays of light.

The parts B' of the spectacle-bows are passed into and held by the hooks D, as shown in Figs. 1 and 3. If the spectacles are not to be used, the lenses are folded down flat against the under side of the shade C, and the nose-piece A' is passed into or under the hook E, and will thus be held to the under side of the shade and will be out of the way. If the spectacles are to be used, the nose-piece A' is unhooked, and the lens-frame is lowered to rest on the nose in front of the eyes, as shown in Fig. 1, the lenses being turned to be in proper position in front of the eyes, the check-lugs *b* preventing the lenses from being turned too far. If the spectacles are not to be used, they can easily be secured on the under side of the rim by means of the hook E, and will be out of the way.

The spectacles can be adjusted for use or removed very rapidly, and cannot be mislaid.

If desired, the spectacles alone can be used without the shade.

Having thus fully described my invention, I claim as new and desire to secure by Letters Patent—

1. In a spectacle-holder, the combination, with the shade C, of the hooks D E on the under side thereof, and of a pair of spectacles, substantially as herein shown and described, and for the purpose set forth.

2. In a spectacle-holder, the combination, with the shade C, of the hooks D E on the under side thereof, the bows B B', the lens-frames A, and the nose-piece A', substantially as herein shown and described, and for the purpose set forth.

3. In a spectacle-holder, the combination, with the shade C, of the hooks D E on the under side thereof, the bows B B', the lens-frames A, pivoted thereto, and the check-lugs b, projecting from the inner sides of the bows, substantially as herein shown and described, and for the purpose set forth.

4. The combination, with the spectacle-bows B B' and the lens-frames A, pivoted thereto, of the check-lugs b, projecting from the inner sides of the bows adjoining to the lens-frames, substantially as herein shown and described, and for the purpose set forth.

JOSEPH ARMSTRONG SHONE.

Witnesses:
A. M. AYRES,
JNO. H. MORGAN.